United States Patent [19]

Watanabe

[11] 3,839,730

[45] Oct. 1, 1974

[54] MAGNETIC RECORDING AND/OR REPRODUCING APPARATUS WITH CO-OPERATIVE LINKING OF TWO MOTORS

[75] Inventor: Yoshimi Watanabe, Yokohama, Japan

[73] Assignee: Sony Corporation, Tokyo, Japan

[22] Filed: July 27, 1973

[21] Appl. No.: 383,111

[30] Foreign Application Priority Data

July 27, 1972 Japan .......................... 47-88530[U]

[52] U.S. Cl. .................... 360/71, 178/6.6 P, 360/84

[51] Int. Cl. ........................ G11b 15/46, G11b 21/04

[58] Field of Search... 179/100.2 S, 100.2 T, 100.2 B; 178/6.6 P; 360/71, 73, 84

[56] References Cited

UNITED STATES PATENTS

| | | | |
|---|---|---|---|
| 3,358,080 | 12/1967 | MacLeod | 178/6.6 P |
| 3,621,149 | 11/1971 | Wada et al. | 179/100.2 S |
| 3,626,115 | 12/1971 | Watanabe | 179/100.2 T |
| 3,654,398 | 4/1972 | Louth | 179/100.2 T |
| 3,663,764 | 5/1972 | Trost et al. | 179/100.2 S |
| 3,686,432 | 8/1972 | Deguchi | 179/100.2 S |
| 3,699,247 | 10/1972 | Mashima | 179/100.2 T |

*Primary Examiner*—Alfred H. Eddleman
*Attorney, Agent, or Firm*—Lewis H. Eslinger, Esq.; Alvin Sinderbrand, Esq.

[57] ABSTRACT

Magnetic recording and reproducing apparatus having a first direct current motor to drive the rotary magnetic heads and the capstan, and a second direct current motor to drive the take-up reel during recording and reproducing and the supply reel during rewind. Means are also provided to couple the second motor to the capstan during playback of the recorded tape. The phase of rotation of the first motor is controlled during the recording operation. At the same time, the speed of the second motor is controlled. During playback, the phase of the second motor is controlled.

14 Claims, 5 Drawing Figures

PATENTED OCT 1 1974

3,839,730

SHEET 1 OF 3

MAGNETIC RECORDING AND/OR REPRODUCING APPARATUS WITH CO-OPERATIVE LINKING OF TWO MOTORS

BACKGROUND OF THE INVENTION

1. Field of the Invention

This invention relates to video tape recorders and particularly to recorders having separate direct current motors for the rotary magnetic head and capstan and for the take-up reel, the recorder including means to connect the latter motor to the capstan to drive the latter under phase-controlled conditions when the recorder is used to reproduce signals from the tape.

2. The Prior Art

Video tape recorders, which are also capable of acting as playback devices to reproduce information recorded on the tape, have been built for a number of years in rather heavy form, not easily moved from place to place. Recently, the desire for portable video tape recorders has become stronger. Such devices must be light enough to be carried easily, which means that they must be able to operate at low power drain. They must also be capable of recording accurately, even under adverse conditions, such as while being carried.

A battery-powered recorder has been proposed, but it had a supplemental motor or a supplemental induction brake to cause the rotary magnetic heads to coincide with recorded tracks in order to reproduce the video signals thereon. In addition, the motor has to be large enough to drive the tape transport mechanism at the required constant speed. Consequently, the total weight and size were greater than desired and the mechanism was too expensive.

Stability of operation is especially necessary during recording, which may take place while the recorder is being carried. The recorder is usually placed on a desk or a table during playback, or else the tape is transferred to a stationary machine for playback.

SUMMARY OF THE INVENTION

The present invention includes the usual supply and take-up reels for tape, and a tape drum with a pair of rotary magnetic heads making contact with the tape through a slot between two parts of the drum. A first direct current motor is coupled both to the rotary magnetic heads and to a capstan that pulls the tape past the drum at a fixed speed. A second direct current motor is connected either through a slipping clutch mechanism during forward movement of the tape during recording and playback operations or directly to the supply reel during rewind.

During recording, the second motor is operated at a relatively constant speed but has no direct connection with the capstan. The speed of the first motor is not only controlled by synchronizing signals from the video signal being recorded, but the phase of operation is also controlled. This is necessary because the convention of video recording calls for each television field to be recorded on a slant track on the tape and with the vertical synchronizing signal recorded along one edge, or sometimes both edges, in omega-wrap apparatus. Thus, as one of the magnetic heads reaches the position to begin recording a new track, it must do so at the proper time to cause the vertical synchronizing signal to be recorded in exactly the proper position.

The relation between the angular position of the rotary magnetic heads and the signal is maintained by extracting a suitable pulse signal from the video signal and comparing its timing, or phase, with that of a pulse signal generated in a stationary coil by a magnet attached to the shaft of the rotary heads and rotating close to the coil. A voltage obtained by comparing the timing of pulses in these signals is used to control the first motor during recording. The pulses derived from the video signal are also recorded along the edges of the tape by a stationary control head. Since the position of the rotary heads is precisely related, in the manner just set forth, to specific positions on the tape, and the location of the control head is also fixed, the recorded pulses can be used during playback to control the angular position of the rotary heads as the tape moves.

During playback, the second motor is coupled to the capstan as well as to the take-up reel. The control circuit is also switched so that the timing of pulses from the stationary coil adjacent the magnet on the rotary head shaft is compared with pulses reproduced by the control head and originally recorded by it. The comparison signal is applied to the second motor to control its exact angular rotation to make it correspond with the tracks on the tape. The first motor may be run at a controlled speed by means of a speed control circuit. Alternatively, the timing of pulses from the stationary coil may be compared with pulses from a standard frequency oscillator in the tape recorder, and the signal that results from the comparison may be used to control the first motor while pulses from the standard frequency oscillator may, at the same time, be compared with pulses from the control head to produce a second motor to control the phasing of the capstan.

DETAILED DESCRIPTION OF THE INVENTION

Figure 1:
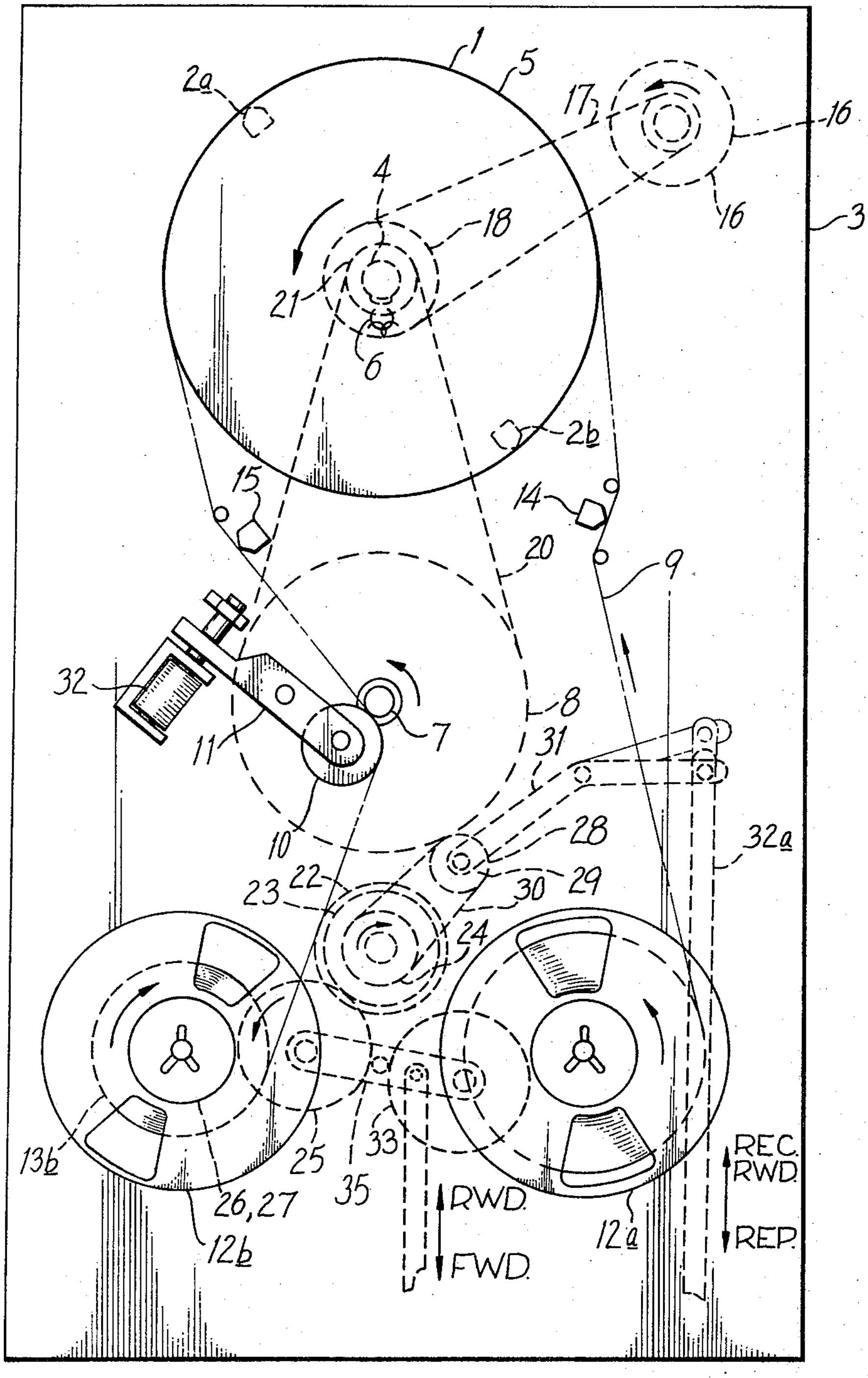
FIG. 1 is a plan view of a video tape deck incorporating this invention.

In FIG. 1 a rotary guide drum 1 having two diametrically opposed rotary magnetic video heads **2*a* and 2*b* is mounted on a chassis 3. The drum rotates at a fixed speed of 30 r.p.m. on an axle 4. Adjacent the rotary guide drum 1 is a fixed tape guide drum 5 having the same diameter and located between the rotary drum and the chassis 3. In an alternative construction, two fixed tape guide drums are axially spaced apart to create a narrow gap therebetween, and the two heads 2*a* and 2*b* are mounted on an arm that rotates on the axle 4** so that the heads are in the narrow gap and against the surface of the tape wrapped helically around the guide drums.

A pulse generator 6 comprising a magnet mounted on the axle 4 and a stationary coil adjacent to the path of the magnet provides pulses to be used in controlling the precise angular setting of the heads **2*a* and 2*b*. A capstan 7 having a flywheel 8 drives the tape 9 in cooperation with a pinch roller 10 mounted on a pinch roller arm 11.**

A supply reel 12*a* and a take-up reel 12*b* are placed on reel disks 13*a* and 13*b*. These disks and some other parts of the mechanism are more clearly shown in FIG. 2, and reference may be made to this figure along with FIG. 1. The tape 9 runs from the supply reel 12*a* past an erase head 14, the guide drums 1 and 5, a fixed control head 15 that includes an audio head, and between the capstan 7 and the pinch roller 10 to the take-up reel 12*b.* A first direct current motor 16 rotates the drum 1 by means of a belt around a pulley 18 on the axle 4 and another pulley 19 on the shaft of the motor. The rotary drum 1 is also connected to the capstan 7 by a belt 20 around a pulley 21 on the axle 4 and around the flywheel 8. The belt 20 is required to be resilient enough to absorb the irregular rotation of the capstan due to the servo loop to be described hereinafter.

A second direct current motor 22 that has an idler wheel 23 and a pulley 24 affixed to its shaft provides power to rotate either the take-up reel 12*b* or the supply reel 12*a*. During forward running of the tape 9 for recording or reproducing, the idler 23 drives another idler 25 that, in turn, drives an idler 26. The latter is part of a slipping clutch take-up assembly 27 attached to the reel disk 13*b* to rotate the disk and the takeup reel 12*b* fast enough to wind up the tape 9.

The motor 22 is also provided with means to connect it to the capstan 7. The interconnection means includes a supplemental idler 28 that can be moved into engagement with flywheel 8 and is shown in that position in FIG. 1. This idler is affixed to a common shaft with a supplemental pulley 29, which is connected to the pulley 24 by a belt 30. The idler 28 and pulley 29 are rotatably mounted on an arm 31 controlled by a push rod 32*a* that places the pulley 29 in the position shown in FIG. 1 when the arm is pulled in the direction indicated as "REPRODUCE." The pinch roller arm 11 is controlled by a solenoid 32 that, when energized, presses the roller 10 against the capstan 7 during either the recording or playback operations.

Another idler wheel 33 is mounted on the other end of a centrally pivoted bar 35 from the idler 25 to engage an idler 34 on the shaft of the take-up disk 13*a*. Another pushrod pivots the arm 35 to cause the idler 25 to engage the idlers 23 and 26 or the idler 33 to engage the idlers 23 and 34, depending on whether the tape 9 is to be run forward or to be rewound.

Figure 2:
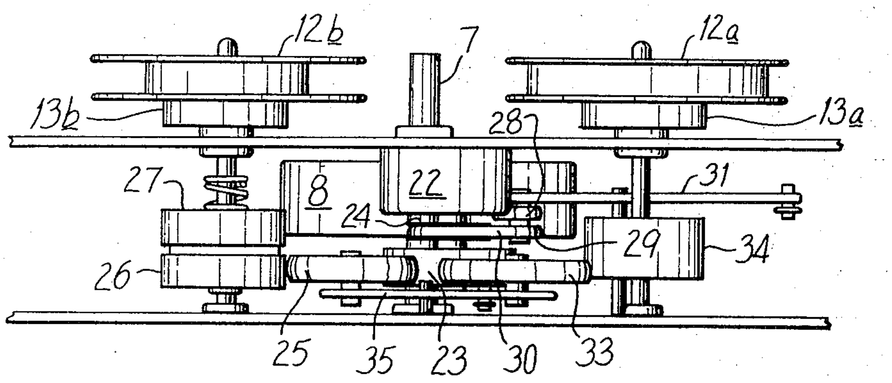
FIG. 2 is a side view of a fragment of the tape deck in FIG. 1.

The important mechanical feature in the apparatus shown in FIGS. 1 and 2 is that power from the second motor 22 is transferred to the capstan 7 only during playback, or reproduction. The mechanical linkages may be changed somewhat from those shown. For example, another pair of idler wheels can be used between the idler 23 and the flywheel 8 instead of transmitting force by way of the belt 30. Alternatively, the motor 22 can be mounted so that, by tilting it slightly, it can be brought directly into contact with the flywheel 8 during reproduction.

The operation of the mechanical components in FIGS. 1 and 2 has three modes:

To record, the solenoid 32 is energized to press the pinch roller 10 against the capstan 7 to force the tape 9 to be pulled along by frictional engagement with the capstan. The idler arm 35 is pivoted to bring the idler 25 into engagement with both the idler 23 and the idler 26 to cause the take-up reel 12*b* to rotate as fast as the movement of the tape 9 past the capstan 7 will permit. The push rod 32a is pressed to the alternative position to disengage the supplemental idler 28 from the flywheel 8.

To reproduce, or play back, the same parts are engaged as to record and, in addition, the push rod 32*a* is moved to the "REPRODUCE" position to bring the supplemental idler 28 into position to engage the flywheel 8.

To rewind, the solenoid 32 is de-energized, the arm 35 is pivoted to its alternative position to disengage the idler 25 and to engage the idler 33 with the idler 23 and the idler 34. The push rod 32a is also moved to its alternative position to disengage the supplemental idler 28 from the flywheel 8.

Figure 3:
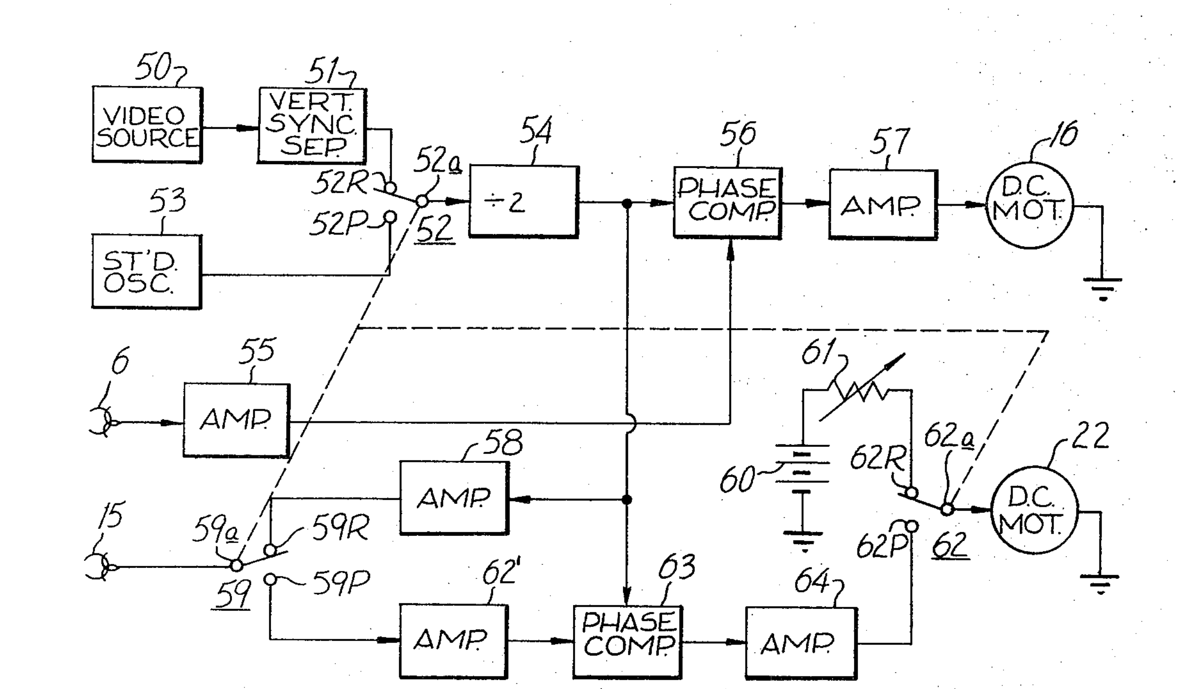
FIG. 3 is a block diagram of one embodiment of a control circuit to be used in conjunction with the tape deck of FIG. 1.

FIG. 3 shows one embodiment of a block diagram for a servo control circuit to be used in the present invention. A video source 50, which may be external to the recording apparatus itself, supplies video signals to a vertical synchronizing signal separator circuit 51. The vertical synchronizing pulses from the circuit 51 are connected by way of a fixed terminal 52R of a switch 52 and the arm 52*a* to a circuit 54 that divides the frequency of the pulses by 2 so that the output pulse repetition rate from the circuit 54 is 30 pulses per second.

A signal from the pulse generator 6 is connected through an amplifier 55 to a phase comparison circuit 56. Pulses from the circuit 54 are also connected to the phase comparison circuit 56, and since the axle 4 in FIG. 1 rotates at a speed of 30 revolutions per second, the frequency of pulses from the pulse generator 6 is equal to the frequency of the pulses from the circuit 54. The phase comparison circuit 56 generates a signal, the amplitude of which depends upon the difference in timing between pulses from the circuit 54 and those from the pulse generator 6. This comparison signal is amplified by the amplifier 57 and is applied to the DC motor 16. The comparison signal controls the operation of the motor 16 to maintain a specific timing relationship between the pulses from the circuit 54 and those from the pulse generator 6.

The 30 pulse per second signal from the circuit 54 is also connected to an amplifier 58, the output of which is connected to one terminal 59R of a switch 59. The arm 59*a* of the switch is connected to the control head 15 to cause the pulses from the circuit 54 to be recorded on the tape 9. Because the head 15 is located at a specific point along the path traversed by the tape 9, the pulses recorded by the head 15 have a specific relationship to the location of each of the slant tracks recorded by the heads 2*a* and 2*b*.

The second direct current motor 22 is operated from a source 60 controlled by a variable resistor 61 and connected through a terminal 62R and the arm 62*a* of a switch 62 to the motor during recording intervals.

Thus, when the apparatus shown in FIGS. 1–3 is used for recording, the pulse signal from the pulse generator 6 is compared with the signal obtained from the video signal source 52, as modified by the vertical synchronizing separator circuit 51 and the circuit 54, with the signal obtained from the pulse generator 6 to control, with great precision, the rotational phase of the rotary magnetic heads 2*a* and 2*b*. However, during recording, the take-up reel 12*b* is driven by the second direct current motor 22 at a speed sufficient to wind up the tape as quickly as it passes between the capstan 7 and the pinch roller 10. Since the supplemental idler 28 in FIG. 1 is disengaged from the flywheel 8, there are fewer effects on the rotation of the rotary magnetic heads 2*a* and 2*b* and on the capstan 7 during recording. Furthermore, each of the direct current motors 16 and 22 can be small and light.

When the apparatus is operated to reproduce, or playback, the recorded information, the switches 52, 59 and 62 are thrown to their opposite positions in which their respective arms 52*a*, 59*a* and 62*a* make contact with the fixed contacts 52P, 59P and 62P. A standard oscillator 53 supplies pulses at the rate of 60 pulses per second to the terminal 52P, and the arm 52*a* connects these pulses to the circuit 54 where their repetition rate is divided by 2. These pulses are connected directly to the phase comparison circuit 56 where they are compared with the pulses from the generator 6 amplified by the amplifier 55. The resultant comparison signal amplified by the amplifier 57 is used to control the rotation of the first motor 16. This assures that the speed of rotation of the motor 16 will be determined by the repetition rate of the pulses from the standard oscillator 53.

The pulses recorded by the control head 59 are now reproduced by the same head and are connected through the arm 59*a* of the switch 59 and through the fixed contact 59P to an amplifier 62'. The output of the amplifier 62' is connected to a second phase comparison circuit 63 that also receives the output pulses of the circuit 54. The output comparison signal from the phase comparison circuit 63 is connected through an amplifier 64 and the fixed terminal 62P of the switch 62 to the arm 62*a*, which is connected to the motor 22. As a result, the rotation of the motor 52 is controlled to maintain a specific time relationship between the pulses picked up by the control head 15 and the signal generated by the standard oscillator 53.

As has been described previously, the supplemental idler 28 in FIGS. 1 and 2 is engaged with the flywheel 8 during playback so that the movement of the tape 9 is controlled to coincide with the slant tracks recorded thereon by the rotating heads 2*a* and 2*b*. In order not to disturb the rotation of the heads 2*a* and 2*b* but to affect the rotation of the capstan 7, the belt 20 is required to be sufficiently resilient. Of course, the average peripheral velocity of the flywheel 8 must be designed to be the same as that of the supplemental idler 28 that presses against the flywheel.

Figure 4:
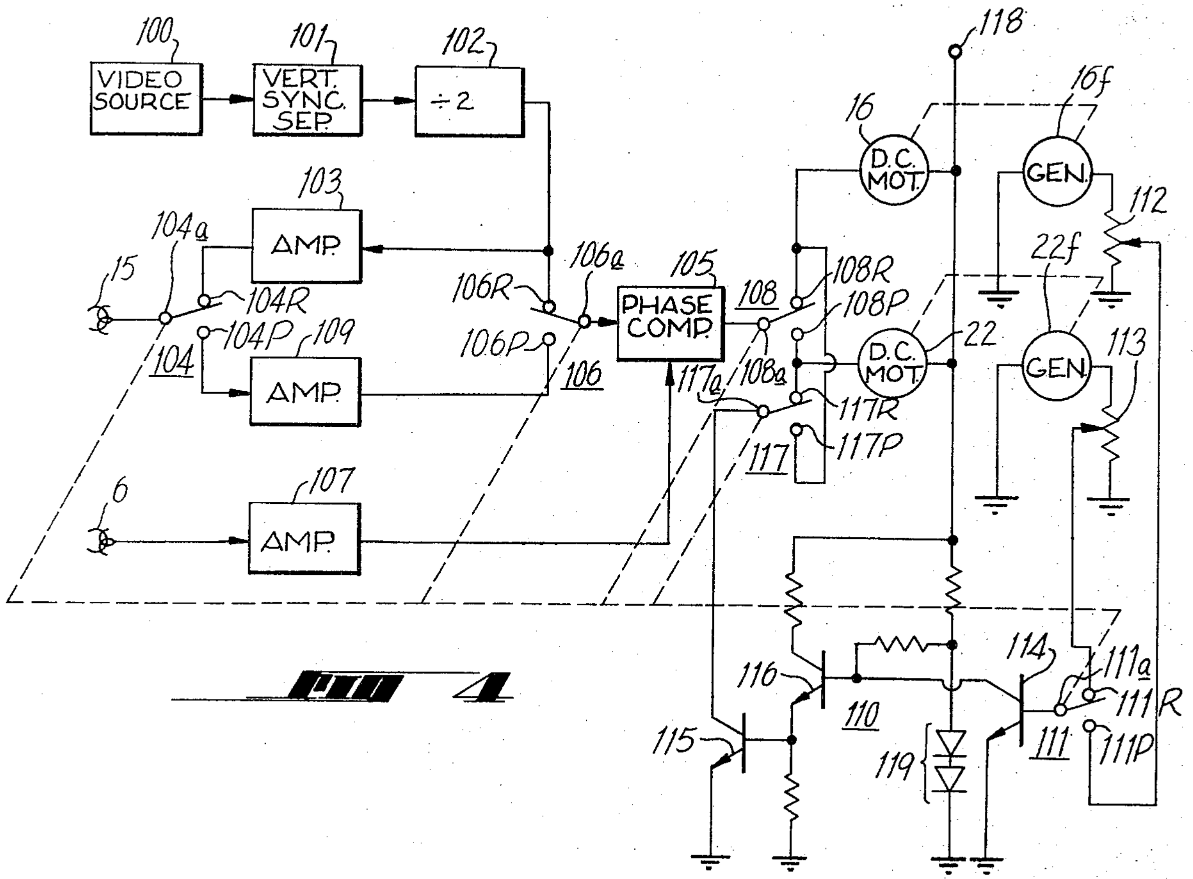
FIGS. 4 and 5 are block diagrams of alternative embodiments of control circuits to be used in conjunction with the tape deck of FIG. 1.

FIG. 4 shows an alternative embodiment of the servo control circuit that may be used in the present invention. This circuit is also used with the mechanical apparatus shown in FIGS. 1 and 2. In the circuit in FIG. 4, two direct current motors are used, each of which has a generator mechanically attached to it to run at the same speed as the respective motor.

As in the embodiment in FIG. 3, a video source 100 supplies a video signal to a vertical synchronizing separation circuit 101 that passes only the vertical synchronizing pulses to a circuit 102 that divides the repetition rate of these pulses by 2. Hence, the output signal of the circuit 102 is a pulse signal having a repetition rate of 30 pulses per second. This pulse signal is fed through an amplifier 103 and the fixed terminal 104R and the arm 104*a* of a switch 104 to the control head 15 to be recorded on the tape 9.

The pulses from the circuit 102 are also transmitted to a phase comparison circuit 105 by way of the fixed terminal 106R and the arm 106*a* of a switch 106. The phase comparison circuit 105 also receives a pulse signal from the pulse generator 6 amplified by an amplifier 107. The output signal from the phase comparison circuit 105 is fed selectively through a switch 108 by way of the arm 108*a* and the fixed terminal 108R to the first direct current motor 16, or by way of the fixed terminal 108P to the motor 22 during playback. During playback, the timing signal reproduced by the control head 15 is fed to the phase comparison circuit 105 by way of the switch 104, an amplifier 109, and the switch terminal 106P.

In this embodiment a constant speed control circuit 110 is applied to the motors 16 and 22 selectively. The motors 16 and 22 have generators 16*f* and 22*f* connected to them to be driven at their respective speeds to generate speed-representative signals. A switch 111 has an arm 111*a* and a fixed terminal 111P connected to the arm of a potentiometer 112 across the output terminals of the generator 16*f*. Another fixed therminal 111R of the switch is connected to the arm of a potentiometer 113 connected across the terminals of the generator 22*f*.

The constant speed control circuit 110 includes an input transistor 114 connected to the switch 111, and output transistor 115, and an intermediate transistor 116. The output of the transistor 115 is connected through the arm 117*a* of a switch 117 to either of the fixed terminals 117R or 117P. The terminal 117R is connected to the motor 22 and the terminal 117P is connected to the motor 16, and both motors are connected to a positive power supply terminal 118.

During recording, the pulse signal from the generator 6 is compared in the phase comparison circuit 105 with the pulse signal from the circuit 102. The resulting comparison signal is a measure of the difference, if any, between the time of occurrence of pulses from the generator 6 and pulses from the circuit 102, and when this comparison signal is applied to the motor 16, it controls the rotational phase position of the rotary megnetic heads 2*a* and 2*b* relative to the timing of pulses from the circuit 102. These same pulses are also recorded by the control head 15. During recording, the switches 111 and 118 connect the control circuit 110 so that it controls the speed of the motor 22.

During playback, all of the switches 104, 106, 108, 111, and 117, which are ganged, are transferred so that their respective arms make contact with the respective playback terminals identified by the letter P in each instance. As a result, the control head 15 becomes a pickup head and reproduces the same pulses it previously recorded. These are compared in the comparison circuit 105 with pulses from the generator 6, and the resultant comparison signal is connected by the switch 108 to the motor 22 to control its rotation. The motor 22 is mechanically connected to the capstan 7 at this time by way of the pulley 24, the belt 30, and the pulley 29, the idler 25, and the flywheel 8. Thus the motor 22 controls the rotational phase of the magnetic heads 2a and 2b, while the motor 16 simply runs at a constant speed under control of the circuit 110.

The motors 16 and 22 are required to have the same characteristics in this embodiment, because both the phase comparator 105 and the constant speed control circuit 110 are used for both of the motors 16 and 22. A series circuit 119 of two diodes is placed in the coupling circuit between the transistors 114 and 116 to trigger the rotation of whichever one of the motors 16 and 22 happens to be connected to the circuit 110 at the beginning of rotation.

Figure 5:
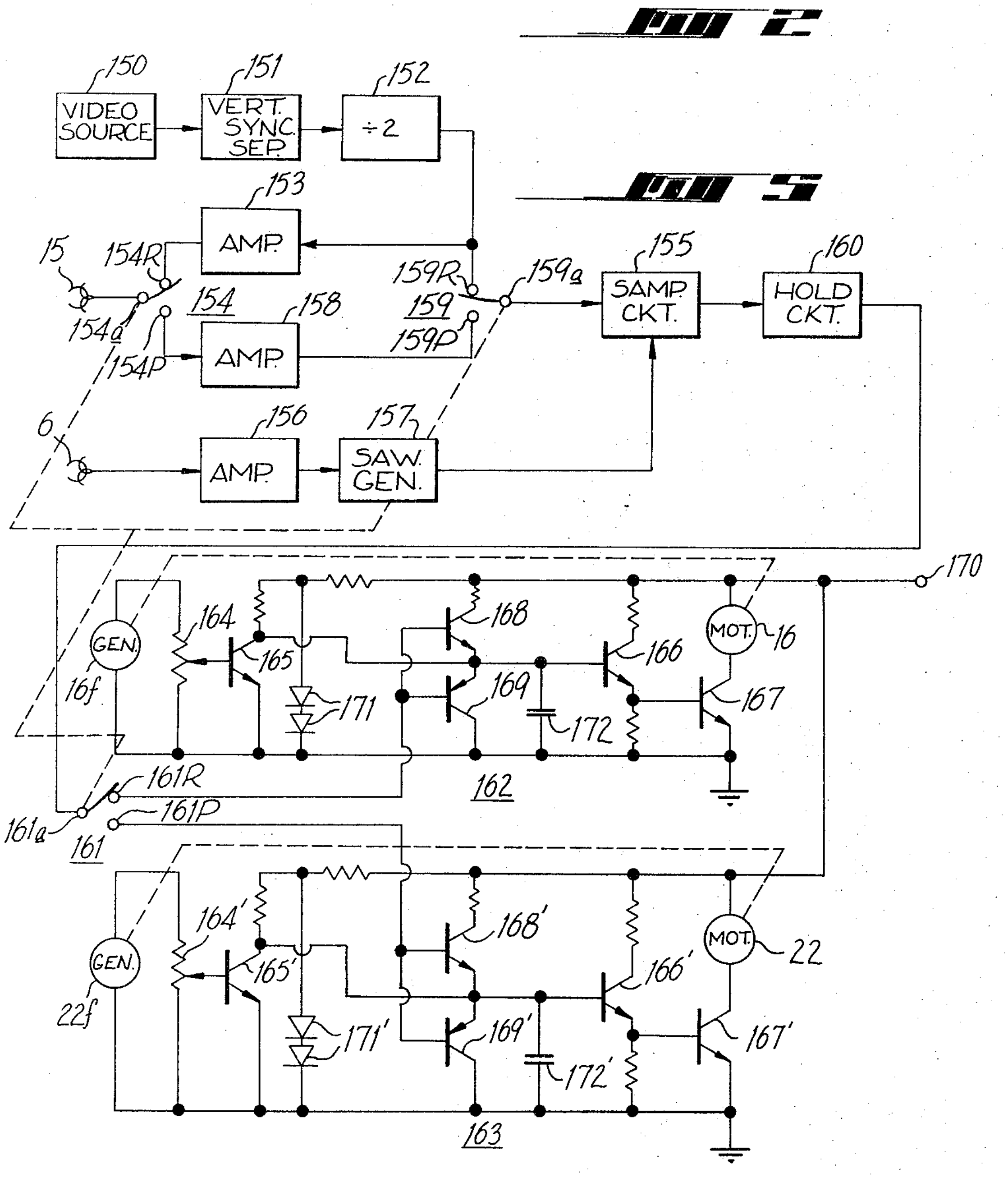

FIG. 5 shows another block diagram of a control circuit for use in this invention. As in the other embodiments, video signals from a source 150 are applied to a vertical synchronizing signal separator circuit 151, and the resultant 60 pulses per second vertical synchronizing signal is applied to the circuit 152 in which the pulse frequency is divided by 2 to produce an output pulse wave of 30 pulses per second. This wave is applied through an amplifier 153 and a switch 154 to be recorded by the control head 15.

The comparison circuit in this embodiment includes a sampling circuit 155. Pulses from the pulse generator 6 are amplified by the amplifier 156 and transformed into a sawtooth wave by the sawtooth generator 157. This sawtooth wave is applied to the sampling circuit to be sampled by pulses applied through the switch 159. The sampled signal is applied to a hold circuit 160, and the voltage of the signal held by the circuit will represent the relative time of pulses through the switch 159 and pulses produced by the generator 6. The output signal of the hold circuit 16 is applied to a switch 161 to be connected either to a speed control circuit 162 or to a speed control circuit 163.

The speed control circuits 162 and 163 are identical. The circuit 162 connects the generator **16*f* to the motor 16 and the circuit 163 connects the generator 22*f* to the motor 22. The circuits 162 and 163 are basically similar to the constant speed circuit 110 in FIG. 4. For example, in the circuit 162, the output signal of the generator, which is directly related to the speed of the motor 16 is applied across a potentiometer 164, and a selected fraction of this voltage is picked off by the arm of the potentiometer and applied to the base of a transistor 165. The output of this transistor is applied to an emitter-follower transistor 166 that supplies a base input signal to a power transformer 167. the collector-emitter output circuit of the latter transistor is connected in series with the motor 16** to control the current through the motor and, therefore, the speed of the motor.

The circuit 162 has two transistors 168 and 169 of opposite conductivity type connected in series between the power supply terminal 170 and ground. If no voltage is applied to these transistors, they are nonconductive, and the speed of the motor 16 is controlled by the circuit 162 in a manner similar to the circuit 110 in FIG. 4. Two diodes are connected as a series circuit across the transistor 165 and part of its load circuit to get an initial action of the direct current motor 16. A capacitor 172 connected across the input to the transistor 166 limits the speed of the response of the feedback loop.

When the apparatus is to record signals, and ganged switches 154, 159, and 161 are in the position shown, the signal from the hold circuit 160 can make one or the other of the transistors 168 and 169 conductive and shift the input to the transistor 166 either up or down to make the motor 16 go faster or slower. Actually, the shift is not so much a shift in speed but in phase position. This controls the phase of the rotary heads **2*a* and 2*b* during recording. At the same time, the corresponding transistors 168' and 169' in the other speed control circuit 163 are non-conductive, and so the speed of the motor 22 is controlled by the generator 22f and the circuit 163.**

On the other hand, when the switch 161 and the other switches 154 and 159 are placed in the playback condition, the rotation of the motor 22 is controlled by the sample-and-hold comparison circuit 155 and 160, while the motor 16 is controlled by the circuit 162. As in the embodiment in FIG. 4, the motors 16 and 22 should have the same characteristics.

Thus, the rotational phase of the motor 16 is controlled during recording and the rotational phase of the motor 22 is controlled during playback, or reproduction.

In this embodiment it is recognized that rotation of the motor was changed by ±5 percent relative to retational speeds of 2,000 r.p.m. to 3,000 r.p.m. when the base current of the transistor 168 or 169 was changed by ±15$\mu$A, whereby proper phase control could be achieved.

What is claimed is:

1. Magnetic tape recording and reproducing apparatus comprising:

A. means to guide said tape along a predetermined path;
B. a rotary magnetic head to contact slant tracks on said tape for both recording and reproducing;
C. signal generating means to generate a signal synchronized to the rotation of said rotary head;
D. a stationary control head at a predetermined point on said path;
E. a capstan to control the movement of said tape;
F. a first direct current motor coupled to said rotary head to rotate the same;
G. resilient first coupling means to couple said first motor to said capstan to cause said rotary head and said capstan to rotate simultaneously;
H. a take-up reel to wind up said tape;
I. a second direct current motor coupled to said take-up reel during recording and reproduction to rotate said reel;
J. second coupling means to couple said second motor to said capstan only during reproduction to supply rotary power to said capstan;
K. signal means to supply a signal synchronized to a reproduced video signal; and
L. comparison means connected to said control head and to said control means to generate a comparison signal and connected to said second motor to supply said comparison signal thereto to coordinate rotation of said capstan with the location of said tracks during reproduction.

2. The apparatus of claim 1 in which said signal means is a fixed frequency oscillator, whereby the magnitude of said comparison signal is the comparison of timing of a signal from said oscillator and a signal reproduced by said control head.

3. The apparatus of claim 2 comprising, in addition, a second comparison circuit connected to said signal generating means and connected to said oscillator during reproduction to generate a second comparison signal, said second comparison circuit being connected to said first motor to control the rotation thereof during reproduction.

4. The apparatus of claim 3 comprising, in addition, a switch to connect said second comparison circuit to said oscillator only during reproduction and to connect said second comparison circuit to a video signal input circuit during recording to generate a third comparison signal to control the rotation of said first motor during recording.

5. The apparatus of claim 1 comprising, in addition:

A. a generator connected to said first motor to be driven thereby to produce a speed-responsive signal;

B. control circuit means connecting said generator to said first motor during reproduction to control the operation of said first motor.

6. The apparatus of claim 5 comprising, in addition:

A. a comparison circuit connected to said signal generating means;

B. switch means to connect a signal to be recorded by said control head to said comparison circuit during recording and to connect the output of said comparison circuit to said first motor during recording to control the operation of said first motor; and C. a second generator connected to said second motor to be driven thereby to produce a second speed-responsive signal to control the speed of said second motor.

7. The apparatus of claim 6 in which said switch means connects said control circuit between said first generator and said first motor during reproduction and, alternatively, connects said control circuit between said second generator and said second motor during recording.

8. The apparatus of claim 6 in which said switch means connects the output of said control head to said comparison circuit during reproduction and the output of said comparison circuit to said second motor during reproduction to control the operation of said second motor.

9. The apparatus of claim 8 comprising, in addition, second control circuit means connecting said second generator to said second motor, said switch means being connected to activate said first-named control circuit means during reproduction and to activate said second control circuit means during recording.

10. The apparatus of claim 1 comprising, in addition:

A. a first generator connected to said first motor to be driven thereby to produce a first speed-responsive signal;

B. a second generator connected to said second motor to be driven thereby to produce a second speed-responsive signal;

C. a speed control circuit;

D. first switch means to connect said speed control circuit between said first generator and said first motor during reproduction and, alternatively, to connect said speed control circuit between said second generator and said second motor during recording; and E. second switch means to connect said comparison means to said first motor during recording and, alternatively, to connect said comparison means to said second motor during playback, whereby said second motor is controlled in response to said comparison signal during reproduction, and in response to said second speed-responsive signal during recording.

11. The apparatus of claim 1 comprising, in addition:

A. a first generator connected to said first motor;

B. first speed control circuit connected between said first motor and said first generator;

C. second generator connected to said second motor;

D. second speed control circuit connected between said second motor and said second generator; and E. switch means to connect said comparison means to said first motor during recording and, alternatively, to connect said comparison means to said second motor during reproduction.

12. The apparatus of claim 1 in which said resilient first coupling means comprises a belt.

13. The apparatus of claim 1 in which said second coupling means comprises a polley and a belt to transmit the rotation of the second motor to said rotary head.

14. The apparatus of claim 1 comprising, in addition, a flywheel attached to said capstan, said coupling means comprising means to tilt said second motor to connect said second motor to said flywheel.

* * * * *